United States Patent [19]

Miyaji et al.

[11] Patent Number: 4,608,593
[45] Date of Patent: Aug. 26, 1986

[54] COLOR TELEVISION CAMERA APPARATUS WITH SELF-DIAGNOSIS FUNCTION

[75] Inventors: Yoshimori Miyaji, Tokyo; Hirokazu Fujiki, Asakusabashi; Fumio Takahashi, Tama, all of Japan

[73] Assignee: Tokyo Shibaura Denki Kabushiki Kaisha, Japan

[21] Appl. No.: 550,044

[22] Filed: Nov. 9, 1983

[30] Foreign Application Priority Data

Nov. 30, 1982 [JP] Japan .................................. 57-209623

[51] Int. Cl.⁴ ....................... H04N 5/225; H04N 17/02
[52] U.S. Cl. .......................................... 358/10; 358/41
[58] Field of Search .................... 358/10, 21 R, 51, 41, 358/139

[56] References Cited

U.S. PATENT DOCUMENTS 4,314,272 2/1982 Miyaji et al. ............................ 358/10
4,320,414 3/1982 Miyaji et al. ............................ 358/10
4,455,569 6/1984 Takahashi ............................... 358/10

Primary Examiner—Michael A. Masinick
Attorney, Agent, or Firm—Finnegan, Henderson, Farabow, Garrett & Dunner

[57] ABSTRACT

A color television camera apparatus wherein a video signal is adjusted by the steps of detecting adjustment data with respect to predetermined adjustment items from the video signal corresponding to the pattern of a test chart, comparing the adjustment data with reference data to obtain correcting data and supplying the correcting data to a video signal adjusting circuit. The correcting data is modified by variation data stored in a memory in advance and the modified correcting data is supplied to the video signal adjusting circuit. The difference between the video signals adjusted on the basis of the correcting data and the modified correcting data is then calculated and judgement is made as to whether the difference falls within a predetermined allowable range, whereby abnormality in the control system of the color television camera apparatus can be detected.

10 Claims, 6 Drawing Figures

COLOR TELEVISION CAMERA APPARATUS WITH SELF-DIAGNOSIS FUNCTION

BACKGROUND OF THE INVENTION

This invention relates to a television camera apparatus, and more particularly to a color television camera apparatus with a self-diagnosis function.

During the operation of a conventional color television camera apparatus, an adjustment which is called a "routine adjustment" is automatically carried out by means of an adjusting means built into the apparatus. In this type of adjustment a predetermined test chart such as a registration chart is picked up by the camera apparatus and video signals from the camera corresponding to the predetermined chart are supplied to a signal processing section incorporated in the apparatus. In the signal processing section the video signals are subjected to adjustments such as gain control, gamma correction, pedestal level correction. The video signals thus processed are supplied to a data detecting section. In this section adjustment data is detected from the video signal and is supplied to an arithmetic operation section in which correcting data is calculated by comparing the adjustment data with a reference data previously stored in a memory section. The correcting data is converted by a correction signal circuit into an analog correcting signal and then is supplied to a defecting circuit and also to a signal processing circuit. Further, the correcting data is stored in the memory section.

As stated above, a video signal control system for a color television camera apparatus has control sensitivities corresponding to each adjustment item. In the course of time, however, the circuits in the control system are subjected to natural deterioration and changes occur in the circuit constants. Minor errors, though individually negligible, may, in the course of time, add up to such a degree as to manifest themselves as a sudden debasement of control accuracy in the system with resultant failure in the operation of the camera apparatus.

A conventional method of checking the operation of the video signal control system of the color television camera apparatus consists of examining the individual circuits of the system one by one in which the output conditions thereof are detected for possible fault in the system operation. The power source is also checked. However, such a method requires the use of certain measuring instruments. Furthermore, this checking method is not preventive. That is, it cannot forecast the occurrence of trouble and therefore corrective action can be taken only after the abnormality in the video signal output or in the power source voltage is observed.

SUMMARY OF THE INVENTION

The present invention is directed to a color television camera apparatus with self-diagnosis function which provides a means of checking its video signal control system for abnormalities possibly occurring in future during the operation of the apparatus, thereby preventing the possible failure of the camera apparatus in advance without the use of measuring instruments.

In accordance with the present invention, a system of checking the condition of the video signal control system for a color television camera apparatus comprises data detecting means for detecting the adjustment data for predetermined adjustment items from a video signal corresponding to the pattern of a test chart, arithmetic operation means for calculating correcting data on the basis of the comparison of the adjustment data with a prestored reference data, adjusting means for adjusting the video signal by the correcting data, variation data supplying means for supplying a variation data, data modifying means for modifying the correcting data with the variation data to produce a modified data calculating means for calculating the difference between the video signal adjusted by the correcting data and the video signal adjusted by the modified data, and judging means for judging whether or not the difference falls within a predetermined allowable range.

According to the present invention, self-diagnosis on the control system of color television camera apparatus can be performed by making use of the operation of the control system itself, thus obviating the use of measuring instruments otherwise required. Further this invention enables detection of a suspicious irregularity, which is hardly traceable by conventional failure detection methods, even where not serious enough to constitute a problem in the control system but likely to develop into a failure in the future.

BRIEF DESCRIPTION OF THE DRAWING

In the accompanying drawings

DETAILED DESCRIPTION OF THE PREFERRED EMBODIMENT

Figure 1:
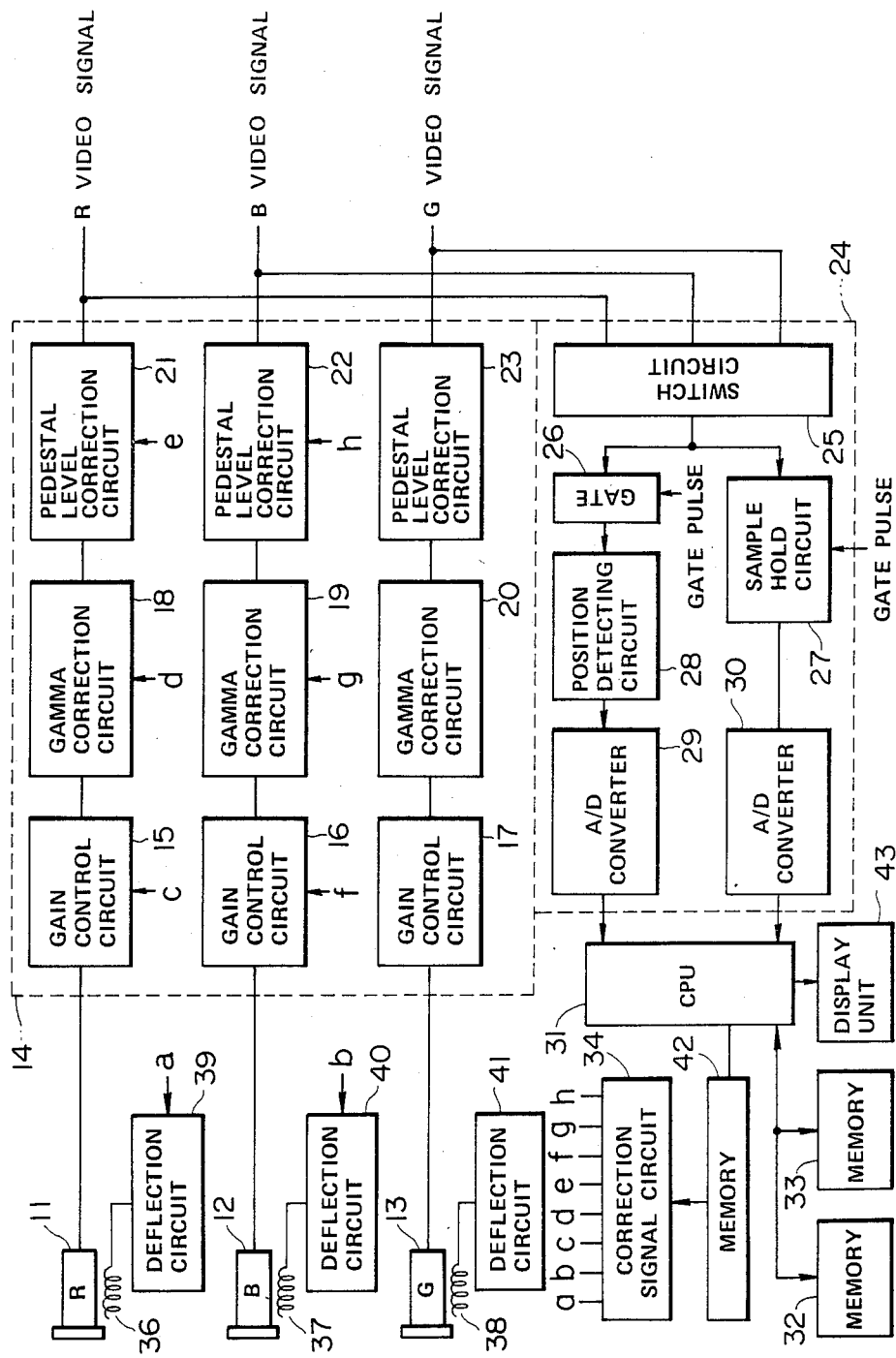
FIG. 1 is a block diagram showing a color television apparatus in accordance with the present invention.

Referring now to FIG. 1, the outputs of red, blue and green color television tubes 11, 12, and 13 are connected, respectively, to the inputs of gain control circuits 15, 16, and 17 provided in a signal processing section 14. The outputs of the gain control circuits 15, 16, and 17 are connected, respectively, to the inputs of gamma correction circuits 18, 19 and 20. The outputs of the gamma correction circuits 18, 19 and 20 are connected, respectively, to the inputs of pedestal level correction circuits 21, 22 and 23. The outputs of the pedestal level correction circuits 21, 22 and 23 are connected, respectively, to the inputs of a switch circuit 25 provided in a data detecting section 24. The output of the switch circuit 25 is connected to the input of a gate circuit 26 and to the input of a sample hold circuit 27. The output of the gate circuit 26 is connected to the input of a position detection circuit 28. The outputs of the position detection circuit 28 and sample hold circuit 27 are connected to an arithmetic operation section, for example, a CPU 31, via respective A-D converters 29 and 30.

To the CPU 31 are also connected memories 32, 33 and 42. To the memory 42 is connected a correction signal circuit 34. This circuit 34 includes a D-A converter which converts the digital data stored in the memory 42 into an analog signal.

Deflection circuits 39, 40 and 41 are connected, respectively, to deflection coils 36, 37 and 38 of the television camera tubes 11, 12 and 13.

Figure 2:
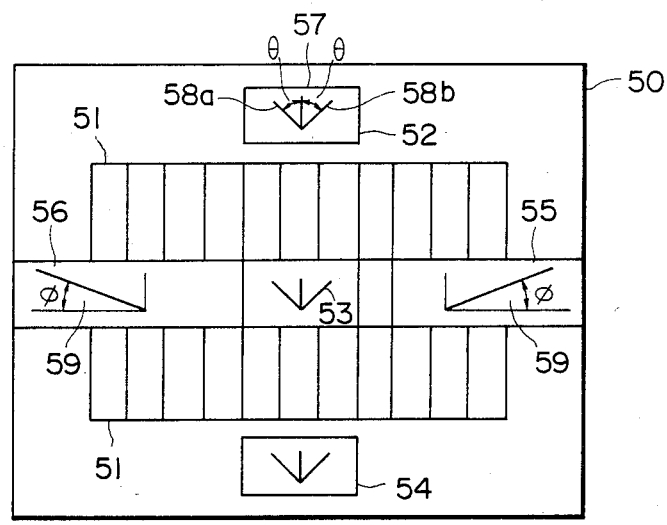
FIG. 2 is an example of a test chart.

When, in the above-mentioned circuit construction, a test chart 50 as shown in FIG. 2 is picked up by the television camera tubes 11, 12 and 13, the video signals corresponding to the pattern of the test chart 50 are outputted from the camera tubes 11, 12 and 13. The test chart is provided with a gray scale 51, substantially V-shaped reference markers 52, 53 and 54, and rotation detection markers 55 and 56. The reference markers 52, 53 and 54 each have a pair of lines 58a, 58b inclined at an angle of $\theta = 45°$ with respect to a central axis 57. Each of the rotation detection markers 55 and 56 has a line 59 which is inclined at an angle $\Phi$ of less than $\Phi = 45°$ with respect to the horizontal line.

Figure 3:
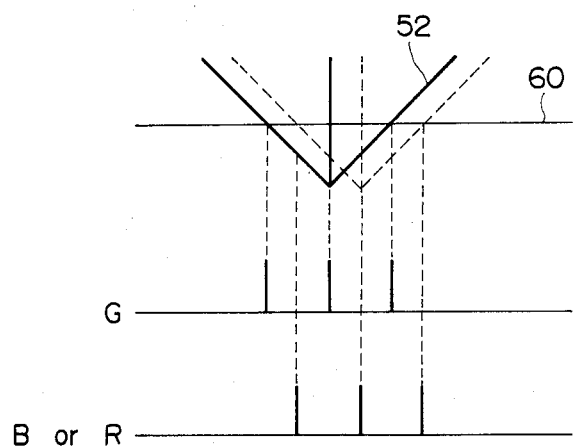
FIG. 3 is the waveform of a marker signal corresponding to a rotation marker.

When supplied to the signal processing section 14, the three color video signals corresponding to the pattern of the test chart 50 having markers as shown in FIG. 2 are subjected, by the gain control circuits, gamma correction circuits and pedestal level correction circuits of the section 14, to gain control, gamma correction and pedestal level correction, respectively. These three color video signals, which have passed through the signal processing section 14, are inputted to the three inputs of the switch circuit 25 of the data detecting section 24. By this switch circuit 25 the G video signal is supplied to the gate circuit 26 and to the sample hold circuit 27. The gate circuit 26, in response to a gate pulse applied there to, supplies the G video signal to the position detecting circuit 28. From a G marker pulse for the G video signal the marker position is detected by position detecting circuit 28. In this case, detection of the marker position is made by the G marker pulse which, as shown in FIG. 3, is generated when a scanning line 60 has passed through the marker 52. The detection signal thus obtained is converted by the A-D converter 29 into a digital value and is stored, as a G marker data, in the memory 32.

Figure 4:
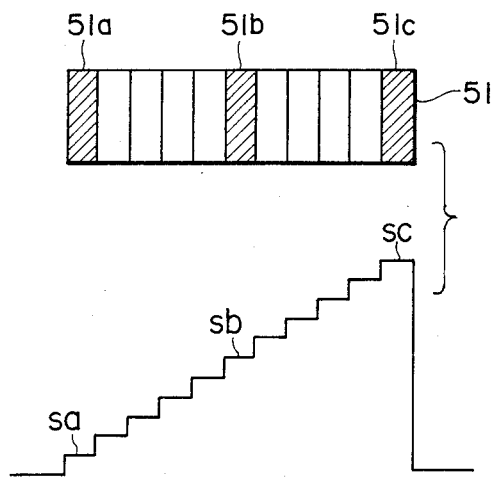
FIG. 4 is the waveform of a gray scale signal with the corresponding gray scale.

In the sample hold circuit 27, the gray scale signals Sa, Sb and Sc corresponding to the regions 51a, 51b and 51c of the gray scale 51 shown in FIG. 4 are picked up from the G video signal in response to the gate pulse, and then are converted by the A-D converter 30 into a digital value and stored, as G gray scale data, in the memory 32.

It should be noted that the G gray scale data and the G marker data are adopted as reference data and are used for comparison, in a manner to be described in detail later, with the B gray scale data and B marker data as well as the R gray scale data and R marker data.

Next, when the B video signal is supplied from the switch circuit 25 to the gate circuit 26 and also to the sample hold circuit 27, the B marker pulse and the gray scale signals Sa, Sb and Sc are obtained in the same manner as in the case of G video signal. The B marker pulse is converted by the A-D converter 29 into a digital B marker data. This B marker data and the G marker data of the memory 32 are compared with each other by CPU 31, whereby the difference between the B and G marker data is detected. The difference data is stored in the memory 42. In accordance with that difference data read from the memory 42, a feedback signal b is supplied from the correction signal circuit 34 to the deflection circuit 40 of the blue television camera tube 12, whereby the B deflection signal is allowed to coincide with the G deflection signal, i.e., a proper registration is attained.

The gray scale sampling signals Sa, Sb and Sc of the B video signal are converted by the converter 30 into B gray scale data. This B gray scale data is compared by the CPU 31 with the G gray scale data stored in memory 32 and the resultant difference data is supplied to the correction signal circuit via the memory 42. In accordance with the difference between the B and G gray scale data, a gain control signal f, gamma correction signal g, and pedestal level correction signal h are outputted from the correction signal circuit 34 and are respectively supplied to their corresponding circuits 16, 19 and 22.

In the same manner as stated above, the position detection of the marker is made with respect to the R video signal and the sampling of the gray scale signal is also carried out. The R marker pulse which is obtained from the position detection is converted into a digital R marker data, while the sampled signals which are obtained by the sample hold circuit 27 are converted into digital R gray scale data by the A-D converter 29. The R marker data is compared with the G marker data whereby the difference between both data is determined, while the R gray scale data is compared with the G gray scale data whereby the difference between both is determined. The correction signals a, c, d and e corresponding to such difference data are supplied from the correction signal circuit 34 to the corresponding circuits 39, 15, 18 and 21, respectively.

In this way the B marker data and the R marker data are compared, respectively, with the reference G marker data while the B gray scale data and the R gray scale data with the reference G gray scale data, whereby the differences between each of the compared pairs are calculated by CPU 31. From these differences the correcting values are calculated. The correcting data corresponding to the correcting values thus obtained is stored as new correcting data, in the memories 32 and 42. From the memory 42, the correcting data is supplied via the correction signal circuit 34 to the respective circuits which perform the desired adjustments. Centering is performed on the basis of the correcting data of the marker 53, adjustment of vertical size is carried out based on the correcting data of the markers 52 and 54, and adjustment of horizontal size is carried out based on the correcting data of the markers 55 and 56. Adjustment of vertical linearity is performed based on the correcting data of the markers 52, 53 and 54 and adjustment of rotation is performed based on the correcting data of the markers 55 and 56. Further, gain control, gamma correction and pedestal level correction are performed on the basis of the gray scale signals Sa, Sb, and Sc.

In the manner described above, various adjustments of the video signal in a color television camera apparatus with the use of a test chart 50 are performed on the basis of the correcting data with respect to each adjustment items.

A description will now be made on the selfdiagnostic function according to this invention. First, the correcting data and the variation data is denoted by $D_i$ and $\alpha_i$, respectively, where $i = 1, 2, 3, \ldots N$. The video signal outputted from the signal processing section 14 when the correcting data $D_i$ is supplied to the correction signal circuit 34 will differ from the video signal when modified data (that is, the correcting data modified by the variation data $\alpha_i$) is supplied. The modified data $M_i$ is formed, for example, by adding or subtracting the variation data $\alpha_i$ to or from the correcting data $D_i$.

Figure 5:
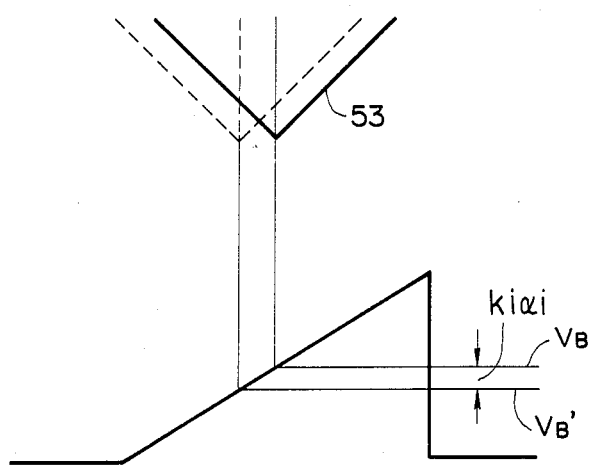
FIG. 5 shows the difference of video signals with respect to a predetermined marker.

More particularly, when the correcting data Di for centering adjustment based on the marker 53 is inputted into the correction signal circuit 34, the signal processing section 14 will produce a video signal (D-based video signal) as shown in solid line in FIG. 5. On the other hand, if the modified data Mi is inputted into the correction signal circuit 34, the data processing section 14 will output a displaced video signal (M-based video signal), as shown by the broken lines in FIG. 5. The difference between the D-based video signal and the M-based video signal corresponds to the magnitude of the variance data αi, so long as the video signal control system of the color television camera apparatus functions in a normal condition. Any significant abnormality or functional degradation in the control system, such as improper linearity or gain, would manifest itself as a deviation of the above-mentioned difference from the predetermined allowable range. In this manner, it is possible to check the condition of the video signal control system of a color television camera apparatus by measuring the difference between the D-based video signal and the M-based video signal.

Figure 6:
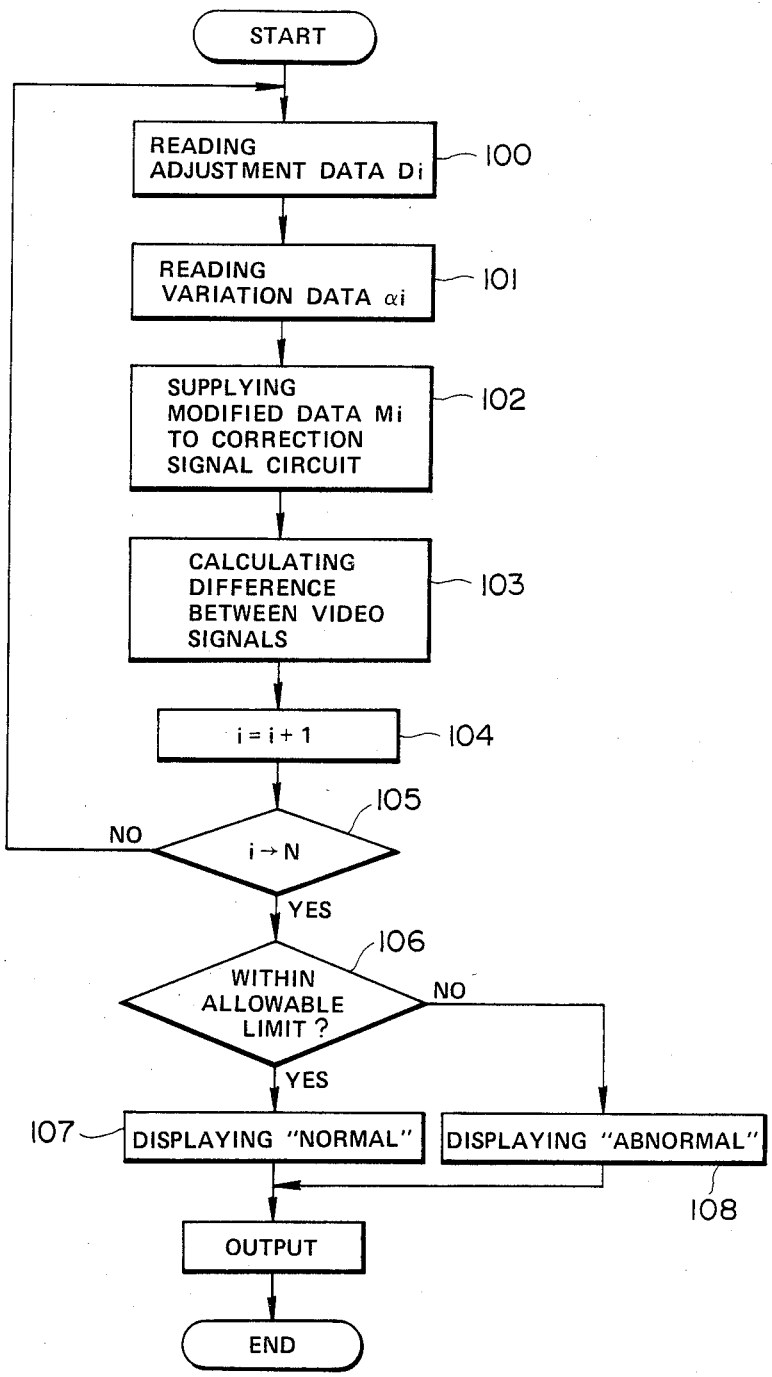
FIG. 6 is a flowchart showing an example of the diagnosis steps of the present invention.

The color television camera apparatus according to the present invention has the above-mentioned function for checking the condition of the video signal control system, and the steps for realizing this checking function will now be described in conjunction with the flowchart of FIG. 6.

Referring to the flowchart, Step 100 refers to the operation of reading out one of the correcting data Di for an adjustment item from the memory 32. At Step 101, the corresponding variation data αi is read out from the memory 33. This memory 33 is a ROM (read-only memory) in which sensitivity data ki indicative of the sensitivity inherent to the video signal control system is stored, which will be described later. Then, the variation data αi is added to or subtracted from the correcting data Di to form the modified data Mi, which is in turn supplied to the correction signal circuit 34 (Step 102). The correction signal circuit 34 in turn produces an analog signal corresponding to the modified data Mi. Now, supposing that the correcting data Di is a data for centering adjustment, a difference will arise between the D-based video signal and the M-based video signal following the process of Step 2, as depicted in FIG. 5. This difference is calculated as a difference between voltages VB and VB' at Step 103. Then, the correcting data Di+1 for a different adjustment item stored in the memory 32 and the corresponding variation data αi+1 in the memory 33 are read out (Step 104). This process is denoted by the notation $i=i+1$ in the flowchart. Likewise, the difference between the D-based video signal and the M-based video signal for this adjustment item is measured. The above Steps 100 to 104 are repeated until the last correcting data Dn and the modified data Mn. The decision whether the data processing has been completed takes place at Step 105.

At Step 106, whether the difference between the D-based video signal and the M-based video signal falls within a predetermined allowable range is judged for all the correcting data Di (i=1, 2, 3, ... N). The results of judgement are displayed on a display unit 43 at Step 107 or 108.

For example, referring to FIG. 5, the difference between the both video signals is VB−VB'. This difference corresponds to the product of the values of the variation data αi and the sensitivity coefficient ki inherent to the signal control system, so long as the camera apparatus operates in normal condition. However, the difference exceeds the value of the product in abnormal conditions. The sensitivity coefficient ki is stored along with the variation data αi in the memory 33. The operation of Step 106 consists of comparing the variance VB-VB' and the product of Ki and α1 to judge whether the difference between them is within predetermined allowable range. In this way, the abnormalities of the video signal control system are checked based on the above judgement.

It should be understood that, although the arithmetic operations in this system are performed by CPU 31, this is a matter of choice, and is not intended to limit this invention to this design. For example, the task of these operations may be achieved by a different circuit or circuits in the camera apparatus.

What is claimed is:

1. A color television camera apparatus with self-diagnosis function comprising:
   detecting means for detecting adjustment data with respect to predetermined adjustment items from a video signal corresponding to a pattern on a test chart;
   arithmetic operation means for calculating correcting data on the basis of the comparison of said adjustment data with reference data;
   adjusting means for adjusting said video signal based on said correcting data;
   variation data supplying means for supplying variation data;
   modifying means for modifying said correcting data by said variation data to produce modified data;
   supplying means for supplying said modified data to said adjusting means;
   calculating means for calculating the difference between the video signal adjusted by said correcting data and the video signal adjusted by said modified data; and
   judging means for judging whether said difference calculated by said calculating means falls within a predetermined allowable range.

2. A color television camera apparatus with self-diagnosis function as set forth in claim 1, further comprising display means for displaying the result of the judgement made by said judgement means.

3. A color television camera apparatus with self-diagnosis function as set forth in claim 1, wherein said modifying means produces the modified data by adding or subtracting said variation data to or from said correcting data.

4. A color television camera apparatus with self-diagnosis function as set forth in claim 1, wherein said arithmetic operating means, said modifying means, said calculating means and said judging means are a central processing unit of a microcomputer.

5. A color television camera apparatus with self-diagnosis function as set forth in claim 1, wherein said detecting means detects respective adjustment data corresponding to a plurality of the adjustment items and said supplying means supplies the corresponding variation data to said respective adjustment data.

6. A color television camera apparatus with self-diagnosis function as set forth in any one of claims 1 and 3 to 5, wherein said supplying means includes a read-only memory.

7. A color television camera apparatus with self-diagnosis function as set forth in claim 5, wherein said judging means performs judging operation one by one for all the judgement items.

8. A color television camera apparatus with self-diagnosis function as set forth in claim 1, wherein said video signal comprises red, blue and green video signals.

9. A color television camera apparatus with self-diagnosis function as set forth in claim 8, wherein said detecting means respectively detects adjustment data corresponding to a plurality of said adjustment items from each of said blue, red and green video signals, and said supplying means supplies the respective variation data corresponding to each of said adjustment data.

10. A color television camera apparatus with self-diagnosis function as set forth in claim 9, wherein each of the adjustment data detected from said green video signal is used as said reference data with which the corresponding adjustment data detected from the red video signal and the blue video signal are compared.

* * * * *